June 4, 1968     KO-HSIN LIU     3,387,123
RATIO COMPUTER AND PAPER FORMATION GAUGE
Filed Jan. 15, 1964
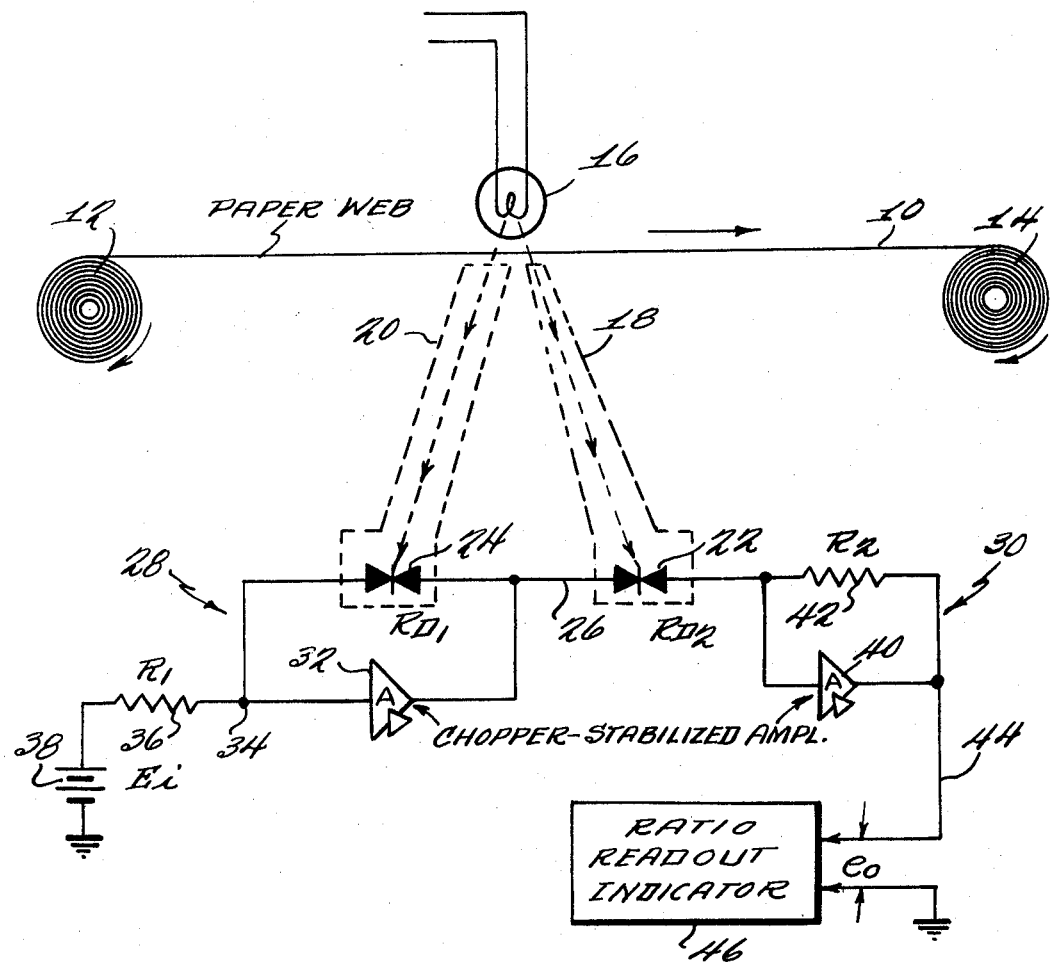
$$e_o = E_i \frac{R_{D1}}{R_1} \frac{R_2}{R_{D2}} = K \frac{R_{D1}}{R_{D2}} = K' \frac{I_{D2}}{I_{D1}} = K'' \frac{\Delta I}{I}$$
INVENTOR
KO-HSIN LIU
BY Cushman, Darby & Cushman
ATTORNEYS

United States Patent Office 3,387,123
Patented June 4, 1968

3,387,123
RATIO COMPUTER AND PAPER
FORMATION GAUGE
Ko-Hsin Liu, Fort Lauderdale, Fla., assignor to Industrial Nucleonics Corporation, a corporation of Ohio
Filed Jan. 15, 1964, Ser. No. 337,788
10 Claims. (Cl. 235—196)

ABSTRACT OF THE DISCLOSURE

Apparatus disclosed herein for computing the ratio of two signals uses two operational amplifiers with the feedback path of the first containing an impedance which varies in value according to the first signal. A second impedance serially couples the amplifiers and is variable in value according to the second signal.

In a specific embodiment, the variable impedances are photodetectors and the first and second signals are respective light beams of different cross-sectional area, derived from transilluminating paper with light and sensing the light by two different size collimators, to obtain from the second amplifier an output proportional to the ratio of the second signal divided by the first signal, as an indication of formation.

Preamble

This invention relates to determining the ratio of two signals, and particularly to an apparatus for computing the ratio of such signals.

Though the apparatus is useful in determining the ratios of signals regardless of from whence such signals are derived, the apparatus has a particular advantage in equipment for determining the structure of material being scanned thereby, such as the "formation" of paper.

It is in this specific field wherein the embodiment of the present invention is described in detail below.

For an introduction of the formation gauging of paper, reference may be made to the Burkhard et al. article "A Formation Tester which Graphically Records Paper Structure" which appeared in the June 1960 issue of Pulp and Paper magazine of Canada, beginning on page T–319. There, it is indicated that when a sheet of paper looks uniform on viewing it up to the light its formation is called good, while an irregular, grainy, or blotchy structure may be described as such or may be called "wild" formation.

The formation of paper may therefore be defined as the uniformity of the randomly oriented fibers. Formation has long been recognized as a fundamental property of paper because it affects strength of the paper, printability, writing quality, and appearance.

It is therefore an object of this invention to provide equipment by which the structure of material, particularly the formation of paper, is detected in an improved manner.

It has been suggested in the past that the ratio of the AC to the DC component of light transmitted through paper be taken as indicative of the formation wildness; see page 1278 of Pulp and Paper, vol. III, second edition by Casey; Williams Patent 2,833,068; and the C. J. Moen papers "A Formation Standard," Tappi, April 1958, vol. 41, No. 4, pages 212A–213A, and "Theory of Differential Sensing" starting at page 34 of the Technical Section, TAPPI, January 1963, vol. 46, No. 1. In these disclosures, and in the Eastman paper published in the last-mentioned Tappi beginning at page 32 and entitled, "A Continuous Two-Spot Formation Recorder," there is the suggestion that two spots of light be employed for the formation of paper. However, these spots of light are of equal size, and the difference signals attained therefrom do not present an accurate account of the paper formation because they do not take into account a large background area.

It has heretofore been discovered by Donald C. Brunton and described and claimed in his copending application, "Structure Determining Apparatus," Ser. No. 335,030, filed Jan. 2, 1964, that a more accurate formation indication can be obtained when two different size light spots are effected with signals therefrom being ratioed. For example, a lighted, relative large area of material is sensed as to its light transmittance to obtain the instantaneous average, say a two inch spot, while a smaller spot, in the order of 0.2 inch for example, is sensed as to its instantaneous light transmittance ability. The detected narrow and wide light beams are applied as electrical signals to an instantaneous ratio computer to obtain an indication of formation change.

The present invention addresses itself to an improved instantaneous ratio computer which, in a specific example, includes the light detectors and is used for gauging paper formation. The ratio computer or detector of this invention is also useful in gloss meters or the like which measure the smoothness, roughness or relative specularity of a surface, for example as in the Foster application, Ser. No. 150,409 filed Nov. 7, 1961.

It has been found, in accordance with the present invention, that when the ratio computer described below in detail is employed in conjunction with the above apparatus for checking formation of paper, the equipment is insensitive to the paper traversal speed and operates under adverse operating conditions.

It is therefore an object of this invention to provide apparatus for computing the ratio of two signals, including two operational amplifiers which are serially connected with the input impedance of the second amplifier being a device having its impedance related to one of the signals, another such device, which has its impedance related to the other signal, being connected in the feedback path of the first operational amplifier. Variations of the impedance of the devices causes the output of the second operational amplifier to be proportional to the ratio of the device impedances, which in turn is proportional to the ratio of the signals, for example $\Delta I/I$, the ratio of light intensity changes to the light intensity of the larger background area.

Still further objects of this invention will become apparent upon reading the appended claims and the following detailed description of the drawing, which illustrates one embodiment of the invention.

As previously indicated, there are two features to this invention, one is the overall gauging of material structure such as the formation of paper, while the other is an improved ratio computer. The latter is explained herein in conjunction with the former.

In the drawing, a paper web 10, which is to have its formation measured, is illustrated as being supplied from a roll 12 to a take-up roll 14. On one side of the paper is a light source 16, which transilluminates the paper to the extent that the randomly oriented fibers in it allow. This degree of light transmission therefore varies very likely, from point to point along the paper. The main question requiring the test is whether the formation of the paper is suitable for the grade and quality that it is intended to have.

On the opposite side of the paper web as light source 16 are two collimators 18 and 20. These have respective light intake diameters or widths causing the cross-sectional areas of the light beams therethrough to be of substantially different size. For example, the collimator aperture 18 may be 100th of the diameter of the collimator aperture 20. An exemplary size of the latter is two inches in diameter. These collimators may be tubes or the like which at their opposite ends enclose or otherwise cause light to be directed onto respective photo-detectors 22 and 24, which may be the solid state type, photoelectric tubes, photo-multipliers, or the like. They are shown as photodiodes.

Line 26 on the input side of photodetector 22 serially connects two operational amplifiers 28 and 30. The former includes a high gain DC amplifier 32 the output of which is fed back to its input at junction 34 via the photodetector 24. The operational amplifier 28 also includes an input resistor 36, which has a resistance value $R_1$ and to which is connected an electronic or other high voltage source such as battery 38.

The other operational amplifier 30 includes the photodetector 22 as its input resistance, along with the high gain DC amplifier 40 the output of which is fed back to the DC amplifier input through resistor 42 which has a resistance value $R_2$. The output of the second operational amplifier 30 is also delivered over line 44 to a ratio readout indicator 46.

The output voltage $e_0$ between line 44 and ground is proportional to the ratio of the intensity of the light signals or beams in collimators 18 and 20. This fact is derived as shown by the equations on the drawing, wherein $E_1$ refers to the voltage of battery 38, $R_{D1}$ is the resistance of the photodetector 24, $R_{D2}$ is the resistance of photodetector 22, $R_1$ is the resistance of resistor 36, and $R_2$ is the resistance of resistor 42. Factors K, K' and K" are different constants involved in making the equalities. Since $E_1$, $R_1$ and $R_2$ are constant, $e_0$ is proportional to $R_{D1}/R_{D2}$. This in turn is inversely proportional to the currents through the respective photodetectors. Therefore any change in light intensity received by photodetector 22 is divided by the light detected by photodetector 24, in the manner determined by the connected operational amplifier. The photodetector impedances or resistances $R_{D1}$ and $R_{D2}$ are inversely proportional to the intensity of the incident lights. The proper DC potential is provided at the output of the first operational amplifier, thereby eliminating any necessity for bias supplies normally required for photodiodes or like detectors. Since both input points of the first and second operational amplifiers are virtually at ground potential, voltages across the photodiodes 22 and 24 are essentially equal in value.

The operation of the circuit in the drawing is greatly enhanced if operational amplifiers 28 and 30 are stabilized as by chopper-stabilization of amplifiers 32 and 40 in a manner well known in the art. Such stabilization maintains a zero input to each of the operational amplifiers 28 and 30, thereby maintaining equal voltages across the photodetector impedances $R_{D1}$ and $R_{D2}$. That is, since these impedances are connected to a common point and have zero voltage at the other ends, the voltage across them is equal and no fluctuation due to unequal voltages across these impedances will occur.

In the drawing photodetector 24, though illustrated as a single photodiode 24, may be several photodiodes connected in parallel, if such is required, to detect the larger amount of light received through collimator 20. A single photodiode is generally sufficient however, perhaps with an optical lens or reflector used therewith.

Although the light signal from the small spot changes due to paper speed and light intensity, the ratio signal $e_0$ nevertheless remains unchanged regardless of paper speed and light intensity. The ratio method of measuring paper formation provides inherent immunity to small changes common to both sides, making the system insensitive to adverse measuring conditions, such as light source variation, average thickness, fluctuation of paper, measuring speed change, paper clutter, temperature variation, extraneous or scatter light, etc.

The ratio computer and formation measuring equipment described above are exceptionally accurate under all operating conditions. In addition, the ratio computer operates suitably fast for the application. There are many analog types of dividers available, but they are too complex or too slow to be suitable in formation gauges. Accordingly, it was necessary to develop the present arrangement. For purposes of recording or otherwise indicating the $e_0$ ratio signal, indicator 46 is employed, with a rectifier (not shown) operating on the signal as it is received. If a large span of readout is desired, a bucking supply may be added in series.

Though the foregoing has described the gauging of paper formation, the same equipment may be employed to determine uniformity of plastic or similar type of materials.

From the foregoing, it is apparent that this invention has provided for all the objects and advantages herein mentioned. Further objects and advantages, and even other modifications of the invention, will become apparent to those of ordinary skill in the art upon reading the foregoing disclosure. However, it is intended that this disclosure be considered exemplary rather than limitative, the scope of the invention being defined by the appended claims.

What is claimed is:
1. Apparatus for computing the ratio of first and second signals, comprising:
    first and second impedances dependent in value upon said first and second signals respectively, and
    first and second operational amplifiers coupled serially and having respective feedback paths and inputs,
    said first impedance being in the said feedback path of said first amplifier and
    said second impedance being in the said input of said second amplifier,
    the arrangement being such that the output of the said second amplifier is proportional to said second signal divided by said first signal.
2. Apparatus as in claim 1 wherein
    said impedances are resistive and vary in resistance inversely proportional to the strength of said signals respectively,
    said first operational amplifier includes a resistor element in its said input, and
    said second operational amplifier includes another resistive element in its said feedback path.
3. Apparatus as in claim 2 wherein said first and second impedances are photodetectors.
4. Apparatus as in claim 3 including means for causing the said first and second signals to be respective light beams of different cross-sectional area.
5. Apparatus as in claim 4 and further including:
    source means for transilluminating material structural variations in which are indicated by said second amplifier output, and
    means for causing relative movement between said material and photodetectors,
    said photodetectors being disposed to receive said different light beams from said transilluminated material.
6. Apparatus as in claim 1 wherein said operational amplifiers are stabilized.
7. Apparatus for computing the ratio of first and second signals, comprising:
    first and second amplifiers including respective sets of inputs and outputs and respective feedback paths between the said output and input of each,
    first and second signal receiving means having respective impedances determined by said first and second signals respectively,
    said first signal receiving means being in the said feedback path of said first amplifier,
    means coupling said second signal receiving means from the said output of said first amplifier to the said input of said second amplifier,
    impedance means in the feedback path of said second amplifier, and means including other impedance means for energizing said first amplifier at its said input, the arrangement being such as to cause from said second amplifier an output proportional to said second signal divided by said first signal.

8. Apparatus for continuously computing the ratio of first and second variable intensity signals, comprising:

first and second amplifiers including respective sets of inputs and outputs and respective feedback paths between the said output and input of each, first and second signal receiving means having respective resistive impedances variable in accordance with the said intensity of said signals respectively, said first signal receiving means being in the said feedback path of said first amplifier, means including said second signal receiving means for serially coupling the output of said first amplifier to the input of said second amplifier, a third resistive impedance in the said feedback path of said second amplifier, and means including a fourth resistive impedance in the input to said first amplifier, the arrangement being such as to cause from said amplifier, when said first amplifier is energized via said fourth resistive impedance, an output proportional to said second signal divided by said first signal.

9. Equipment for determining the formation of paper including the apparatus of claim 8 in combination with:

light source means for transilluminating said paper, two photodetectors, as said signal receiving means, which vary inversely proportional in resistance as the intensity of received light, means for causing relative scanning movement of said paper and photodetectors with the paper in between the photodetectors and light source means, means for collimating the transmitted light received from said source means via said paper into two columns differing in cross-sectional area, said two light columns being said first and second variable intensity signals which occur during said scanning movement to vary the resistance of said photodetectors as aforesaid and cause the said second amplifier output to be a varying ratio signal indicating variations in the formation of the paper.

10. Apparatus as in claim 8 wherein said amplifiers are chopper-stabilized.

References Cited

UNITED STATES PATENTS

| | | | |
|---|---|---|---|
| 2,878,395 | 3/1959 | Mindheim | 250—219 |
| 3,132,254 | 5/1964 | Woodward | 250—219 |
| 3,181,003 | 4/1965 | Sauber | 250—209 |
| 3,235,735 | 2/1966 | Blank | 250—209 |

FOREIGN PATENTS 834,475  5/1960  Great Britain.

MALCOLM A. MORRISON, *Primary Examiner.*

J. RUGGIERO, *Assistant Examiner.*